United States Patent
Furtwängler

(10) Patent No.: US 7,682,056 B2
(45) Date of Patent: Mar. 23, 2010

(54) MIRROR MOUNTING BRACKET WITH ILLUMINATION MEANS

(75) Inventor: Martin Furtwängler, Eberdingen-Nussdorf (DE)

(73) Assignee: SMR Patents S.a.r.l., Luxembourg (LU)

( * ) Notice: Subject to any disclaimer, the term of this patent is extended or adjusted under 35 U.S.C. 154(b) by 94 days.

(21) Appl. No.: 10/537,165

(22) PCT Filed: Nov. 26, 2003

(86) PCT No.: PCT/DE03/03904

§ 371 (c)(1),
(2), (4) Date: Nov. 4, 2005

(87) PCT Pub. No.: WO2004/050428

PCT Pub. Date: Jun. 17, 2004

(65) Prior Publication Data

US 2006/0133101 A1 Jun. 22, 2006

(30) Foreign Application Priority Data

Dec. 2, 2002 (DE) .............................. 102 56 197

(51) Int. Cl.
*B60Q 1/32* (2006.01)
*B60R 1/08* (2006.01)
*B60R 1/12* (2006.01)

(52) U.S. Cl. ................... 362/494; 362/547; 362/548; 362/549

(58) Field of Classification Search ............. 362/494, 362/545, 547

See application file for complete search history.

(56) References Cited

U.S. PATENT DOCUMENTS

| 1,223,981 | A | * | 4/1917 | Johnson | 362/494 |
| 1,368,644 | A | * | 2/1921 | Mochizuki | 362/494 |
| 1,381,561 | A | * | 6/1921 | Johnson et al. | 362/494 |
| 1,814,728 | A | * | 7/1931 | Moore | 362/494 |
| 2,595,331 | A | * | 5/1952 | Calihan et al. | 362/494 |
| 4,211,955 | A | * | 7/1980 | Ray | 315/53 |
| 5,014,167 | A | * | 5/1991 | Roberts | 362/494 |
| 5,017,903 | A | * | 5/1991 | Krippelz, Sr. | 362/494 |
| 5,160,200 | A | * | 11/1992 | Cheselske | 362/249 |
| 5,660,457 | A | * | 8/1997 | Lyons | 362/494 |
| 5,669,699 | A | * | 9/1997 | Pastrick et al. | 362/494 |
| 6,049,271 | A | * | 4/2000 | Chu | 362/494 |
| 6,152,590 | A | * | 11/2000 | Furst et al. | 362/494 |
| 6,227,689 | B1 | * | 5/2001 | Miller | 362/494 |
| 6,357,902 | B1 | * | 3/2002 | Horowitz | 362/545 |
| 6,371,636 | B1 | * | 4/2002 | Wesson | 362/545 |
| 6,572,250 | B1 | * | 6/2003 | Assinder et al. | 362/494 |
| 6,805,474 | B2 | * | 10/2004 | Walser et al. | 362/494 |
| 6,827,468 | B2 | * | 12/2004 | Galli | 362/547 |
| 7,195,382 | B1 | * | 3/2007 | Foote | 362/494 |

(Continued)

FOREIGN PATENT DOCUMENTS

EP 1 304 260 A 4/2003

(Continued)

*Primary Examiner*—Ismael Negron
(74) *Attorney, Agent, or Firm*—Reising Ethington P.C.

(57) ABSTRACT

An exterior rearview mirror including a mirror mounting bracket for attachment to a vehicle, and at least one perimeter light with a light source arranged on a thermally conductive carrier (e.g. a printed circuit board) in thermally conductive connection with the mirror mounting bracket. The light source is preferably an LED.

7 Claims, 6 Drawing Sheets

U.S. PATENT DOCUMENTS

| | | | |
|---|---|---|---|
| 7,226,194 B2 * | 6/2007 | Oehmann | 362/494 |
| 2001/0036081 A1 * | 11/2001 | Gilbert et al. | 362/494 |
| 2002/0159270 A1 * | 10/2002 | Lynam et al. | 362/492 |
| 2002/0191408 A1 * | 12/2002 | Miller | 362/494 |
| 2003/0043590 A1 * | 3/2003 | Walser et al. | 362/494 |
| 2004/0022064 A1 * | 2/2004 | Kuo | 362/494 |

FOREIGN PATENT DOCUMENTS

WO     WO 02 08015 A     1/2002

* cited by examiner

MIRROR MOUNTING BRACKET WITH ILLUMINATION MEANS

CROSS-REFERENCE TO RELATED APPLICATIONS

This application is a National Stage of International Application No. PCT/DE2003/003904 filed Nov. 26, 2003, which claims priority to German Patent Application No. DE 102 56 197.4 filed on Dec. 2, 2002. The disclosures of the above applications are incorporated herein by reference.

FIELD OF THE INVENTION

The invention concerns an exterior rearview mirror for vehicles, more particularly motor vehicles.

BACKGROUND OF THE INVENTION

Exterior rearview mirrors are known in which the mirror mounting bracket is provided with a perimeter light containing at least one lighting means. Such lighting means develop relatively intense heat which can lead to damage to the perimeter light and/or the exterior rearview mirror.

The object of the invention is to design an exterior rearview mirror of this type such that the heat generated by the lighting means has no adverse effects.

This object is attained in accordance with the invention in an exterior rearview mirror of the type of the present invention.

SUMMARY OF THE INVENTION

As a result of the inventive design, the heat generated by the lighting means is transmitted by the carrier to the mirror mounting bracket. In this way, excessive heating of the perimeter light and mirror mounting bracket is avoided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DESCRIPTION OF THE DRAWINGS

Additional features of the invention are apparent from the other claims, the description, and the drawings.

BRIEF DESCRIPTION OF THE DRAWINGS

Figure 1:
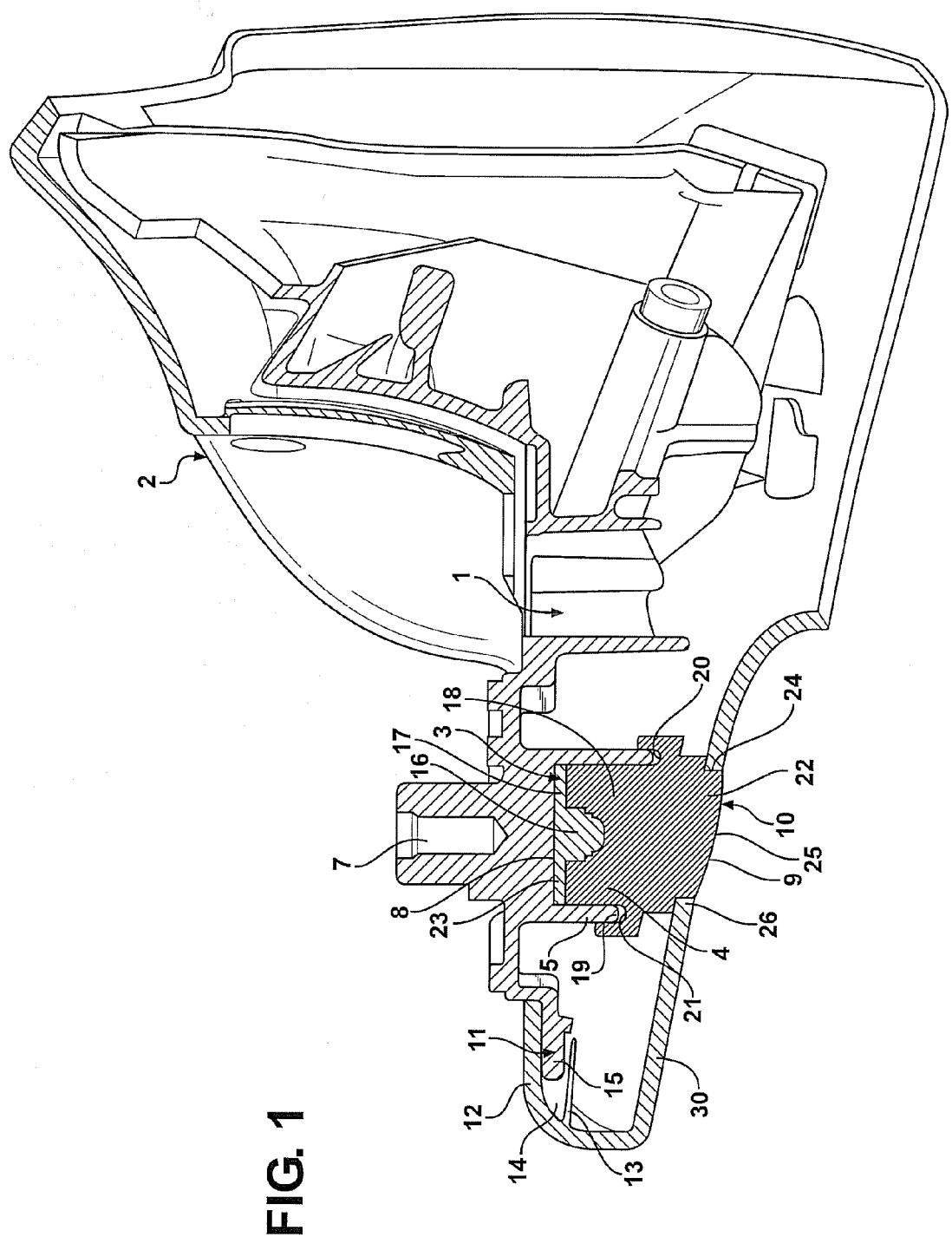

The invention is explained in detail below on the basis of several example embodiments shown in the drawings. The drawings show:

i. FIG. 1 a perspective view in cross-section of a mirror mounting bracket of an inventive exterior rearview mirror with a perimeter light, ii. FIGS. 2-6 each show an additional embodiment of an inventive exterior rearview mirror in views similar to that of FIG. 1.

DETAILED DESCRIPTION OF THE PREFERRED EMBODIMENTS

FIG. 1 shows a mirror mounting bracket 1 with a cover 2 and a perimeter light 3 of an exterior rearview mirror that is attached to a vehicle (not shown) by the mirror mounting bracket 1. Fastened to the mirror mounting bracket 1 in an articulated fashion is a mirror head 100 (shown in phantom) that can be swiveled from an operating position into a non-operating position adjacent to the vehicle. An area beneath the exterior rearview mirror and adjacent to the vehicle or vehicle doors can be illuminated by means of the perimeter light 3.

The mirror mounting bracket 1 has a receptacle 4 for the light 3, preferably composed of a surrounding ridge 5. The receptacle 4 may have a round or angular cross-section. The height of the ridge 5 varies over its extent to correspond to the varying overall height of the mirror mounting bracket 1 in the vicinity of the installation space for the perimeter light 3. In the example embodiment, the receptacle 4 is located in the vicinity of a hole 7 that accommodates a bearing pin for swivel mounting of the mirror head.

The mirror mounting bracket 1 has a support 48, which preferably is made of metal or rigid plastic. The support 48 is covered with respect to the outside by the cap-like cover 2, which has an opening 9 for an optical window 10 of the light 3. In advantageous fashion, the cover 2 is made of plastic. Said cover is held on the support 48 by one or more interlocking connectors 11. The cover 2 has a curved edge section 12 and, extending approximately parallel thereto and spaced apart from it, an inner ridge 13, the two of which define a receptacle opening 14 for a free edge 15 of the support 48.

As lighting means, the perimeter light 3 has an LED 16, which is arranged on a printed circuit board 17, and a light housing 18 that has the optical window 10. The printed circuit board 17 is a flat plastic plate that contains a metal core (not shown) as a thermal conductor, preferably a metal plate having a regular outer contour. In the installation position, the full surface of the metal-core circuit board rests on the flat bottom 8 of the receptacle 4.

The light housing 18 is manufactured as a single piece with the optical window 10 of a light-transmissible plastic. The housing has a circular cross-section with a surrounding edge 19, which edge is L-shaped in cross-section and defines an annular groove 20 for a ring seal 21. The free end of the ridge 5 of the receptacle 4 of the support 1' projects into the annular groove 20. In this way, the housing 18 is secured against rotation in the receptacle 4 in the assembled position. The printed circuit board 17 closes the housing 18 at the end opposite the optical window 10.

A central section 22 of the optical window 10 projects into the housing opening 9 such that the end face 25 of the section 22 is located in the outer side of the cover 2. The housing section 22 completely fills the opening 9 and transitions into the remaining part of the housing through a shoulder 24. The end face 25 is domed outward in an arc with a large radius of curvature over an adjacent lower wall 30 of the cover 2. In the assembled position of the cover 2, the optical window 10 projects into the opening 9 of the cover 2 so that the rim 26 of the opening is located in the shoulder 24. The light housing 18 rests against the inside of the cover 2 adjacent to the rim 26 of the opening. The height of the light housing 18 is slightly greater than the distance between the cover 2 in the vicinity of the housing and the bottom 8 of the receptacle 4 of the support 1'. As a result, the light housing 18 is preloaded with respect to the printed circuit board 17 in the assembled position and with cover 2 installed, so that said circuit board rests, with preloading, against the bottom 8 of the mirror mounting bracket receptacle 4. Since the LED 16 produces very high lumen values per watt, intense heat is developed; said heat is transmitted through the metal core in the printed circuit board 17 directly to the support 1' or conducted to it. In this way, the perimeter light 3 and its housing 18 are protected from excessive heat or overheating.

The cover 2 is pushed over the preassembled optical window 10. During this process, the cover 2 slides over the end face 25 of the optical window 10 with elastic expansion until the rim 26 of the opening snaps into the shoulder 24 of the optical window. In this way, the optical window 10 is braced and held against the carrier 17. Hence additional fastening means for the optical window 10 are unnecessary.

Due to the preloading of the light housing 18, the seal 21 is also elastically compressed between the ridge 5 and the housing 18, thus reliably preventing the penetration of moisture into the housing 18.

Figure 2:
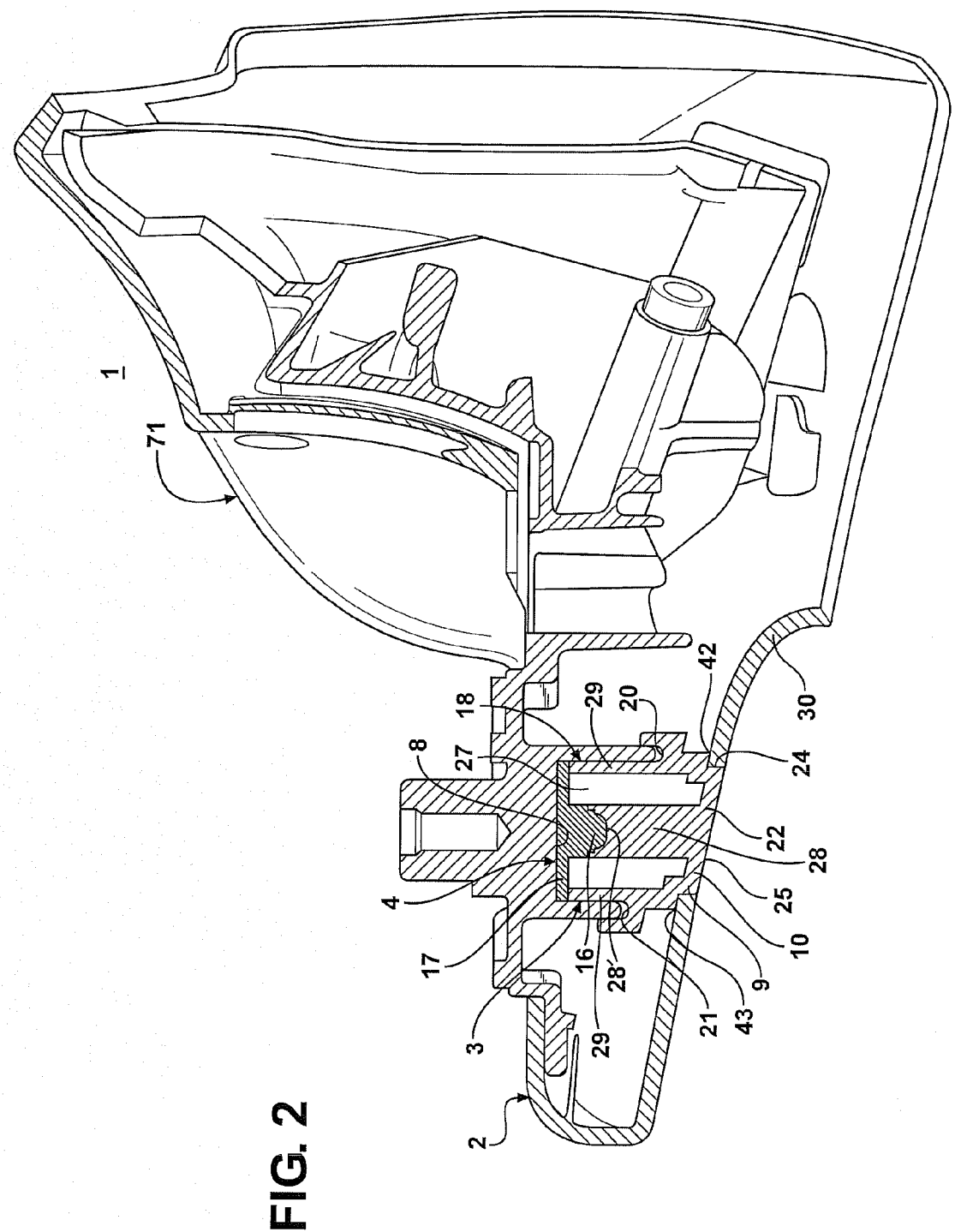

The mirror mounting bracket 71 embodiment shown in FIG. 2 differs from the embodiment described above only in that the light housing 54 has a preferably ring-shaped cavity 27 provided between the housing walls 29, 29' and a central midsection 28. This midsection 28 has at its free end a recess 28' into which the LED 16 projects in a form-fitting manner in the assembled light housing 54. The optical window 50 has the central, protruding housing section 51, which rests in the opening 9. In contrast to the mirror mounting bracket 1 embodiment described above, the end face 52 of the central housing section 51 is designed with a convex curvature so that it lies approximately in a plane with the adjacent lower wall 30 of the cover 2. In this mirror mounting bracket 71 embodiment as well, the light housing 54 is made of light-transmissible plastic.

The light housing 54 has, directly adjoining the outside shoulder 24, another outside shoulder 43 in which is arranged a ring seal 42. In the installation position, the ring seal 42 lies with elastic deformation between the light housing 54 and the inner side of the cover 2, and prevents moisture and/or dirt from entering the mirror mounting bracket 71 through the opening 9. The design of this mirror mounting bracket 71 embodiment is otherwise the same as the previous example embodiment. The metal-core of the printed circuit board 17 is again pressed firmly against the bottom 8 of the receptacle 4 of the support 48, so the heat produced when the LED 16 is turned on is reliably conducted into the support 48.

Figure 3:
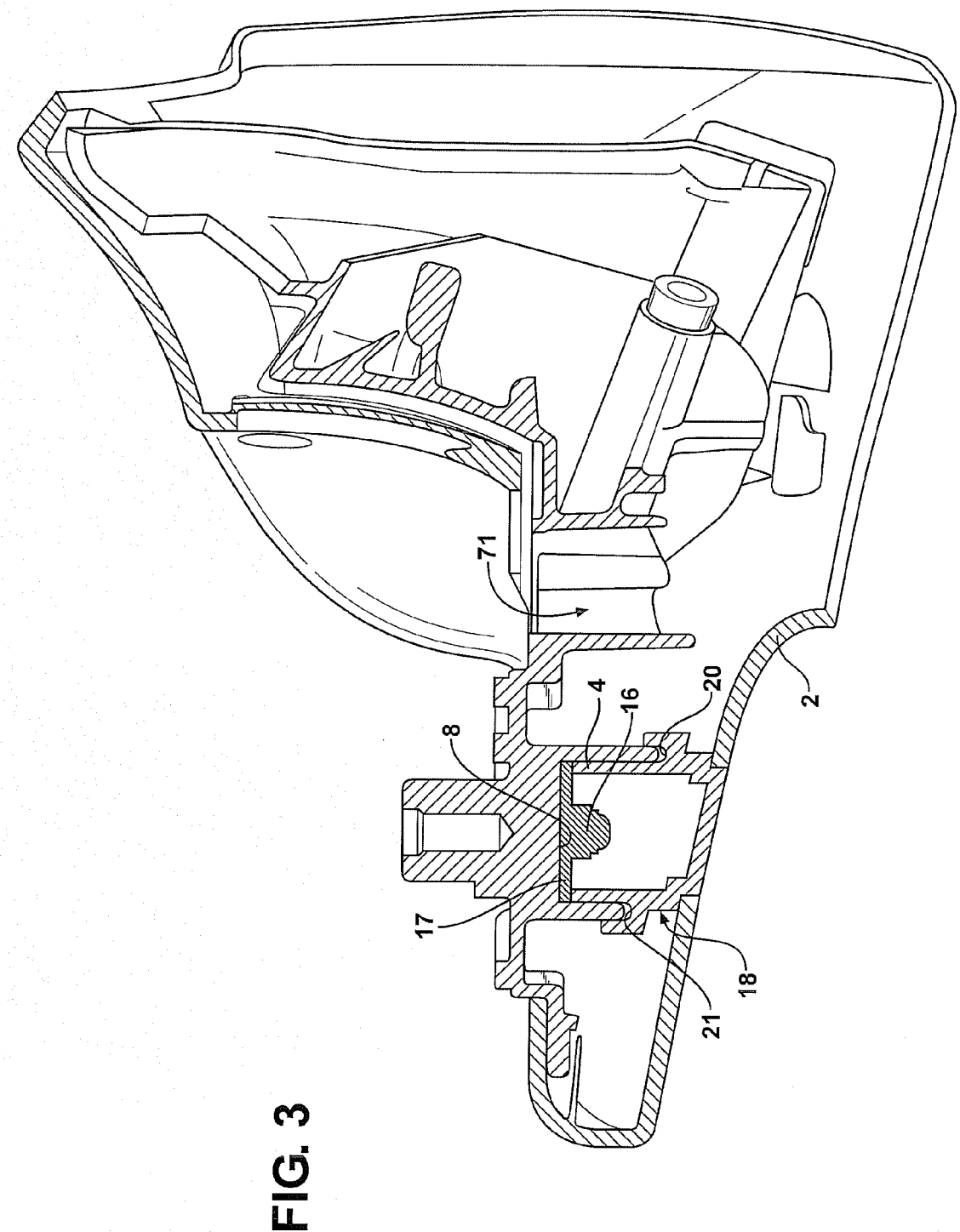

The mirror mounting bracket 81 embodiment in FIG. 3 corresponds to the mirror mounting bracket 71 in FIG. 2 with the sole difference that the light housing 55 is designed without the midsection 28. Together with the LED 16, the printed circuit board 17 with the metal core once again rests with its entire surface against the bottom 8 of the receptacle 4 of the support 48 under pressure. In the assembled position, the housing 55 in FIG. 3 is loaded by the cover 2 in the direction of the support 48. As a result, the ring seal 21 is elastically deformed in the annular groove 20 and the circuit board 17 is pressed against the bottom 8 of the receptacle 4, ensuring rapid and complete heat conduction and reliable sealing of the housing 55.

Figure 4:
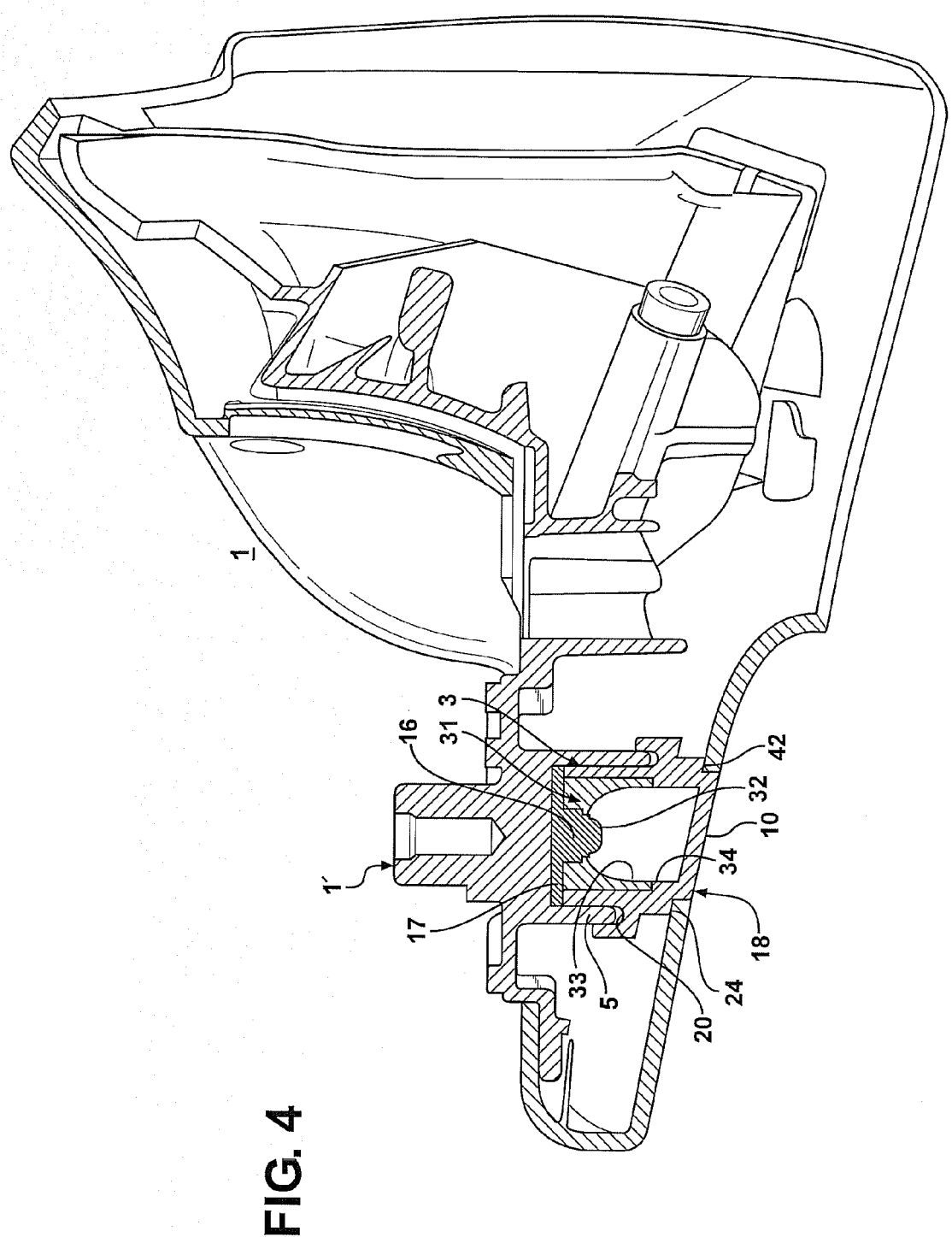

FIG. 4 shows a mirror mounting bracket 91 embodiment corresponding to that in FIG. 3, wherein a light housing 57 has a reflector as an insert reflector 31. It rests against the inner wall of the housing 57 and is provided with an opening 32 through which the LED 16 projects. The reflector 31 has a reflective surface 33, which reflects the light emitted by the LED 16 to an optical window 58. The reflector 31 can have various designs depending on the desired lighting effect, for example it can take the shape of a paraboloid. The free edge of the reflector 31 is supported on an inner shoulder 34 of the housing 58, which shoulder is also present in the housings 18, 54 in FIGS. 2 and 3. The inner shoulder 34 is recessed inward with respect to the outer shoulder 24. The reflector 31 also rests on the printed circuit board 17. The reflector 31 is preferably made of heat-resistant plastic. The design of the perimeter light 59 is otherwise the same as in the perimeter light 61 embodiment shown in FIG. 3.

The reflector 31 can also be designed as a heat-dissipating element. In this case, it is made of metallic material and is designed such that it incorporates the shape of the light housing 57. The annular groove 20 is then located on the outside of the reflector 31. A lens is then set into the free end of such a reflector. In such a design, not only is the heat generated by the LED 16 conducted into the support 48 through the carrier 17, it is also conducted through the reflector 31 into the ridge 5.

Here, too, the heat generated by the LED 16 is rapidly and completely conducted into the support 48 through the printed circuit board 17 of the perimeter light 3.

Figure 5:
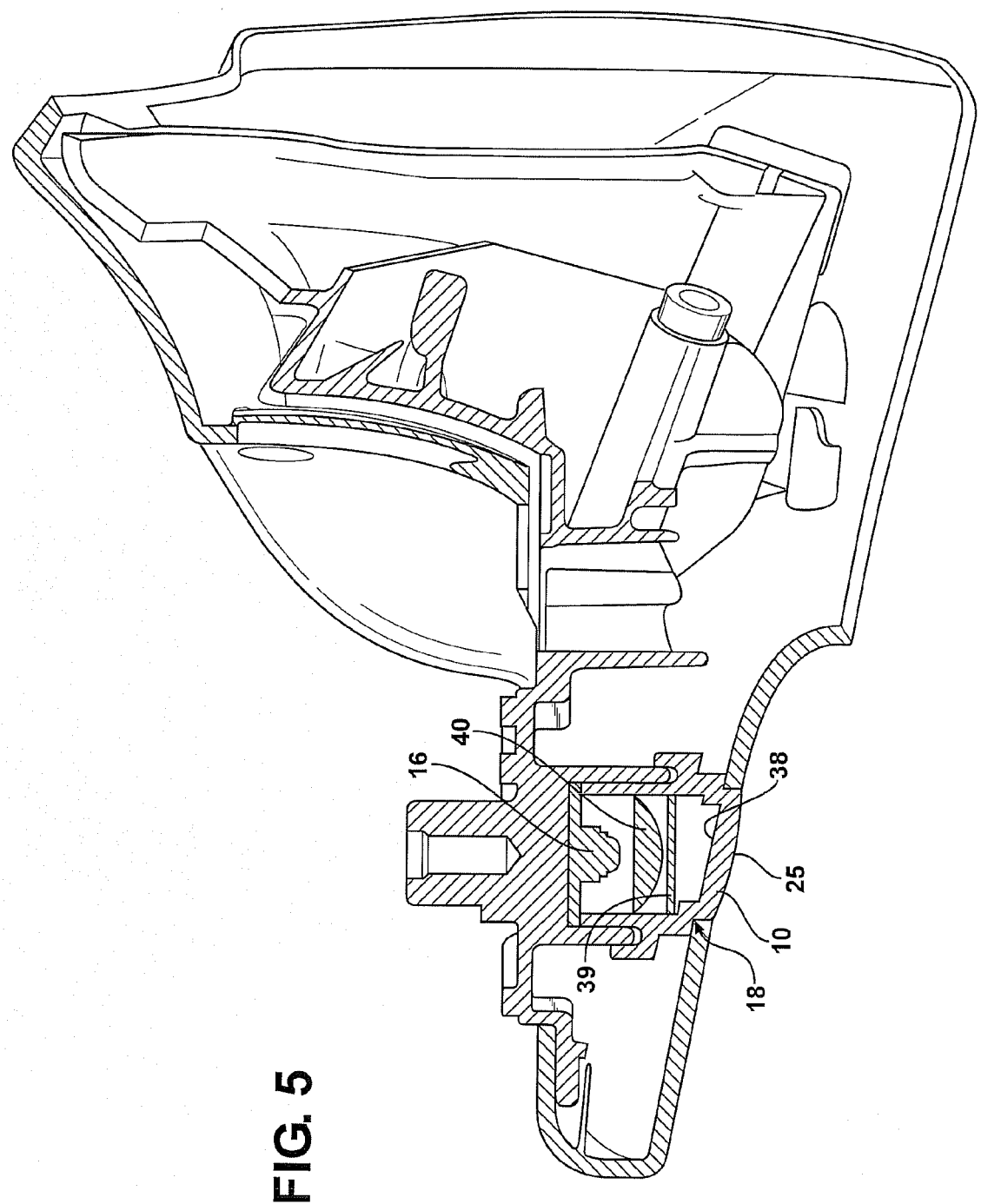

FIG. 5 shows a mirror mounting bracket 92 embodiment in which the light housing 63 largely corresponds to that shown in FIG. 3. However, an end face 65 of a central section 66' of the optical window has a concave curvature as in the mirror mounting bracket 1 embodiment in FIG. 1. The inner side of the optical window 66 is provided with an optical structure 38 which can be used to achieve a directed guidance of the light emitted by the LED 16. Located a distance behind the optical window 66 is an optical element 39, which is designed as a Fresnel lens, for example. A lens 40 is accommodated in the housing 63 between the optical element 39 and the LED 16. The optical elements 38 through 40 can, of course, also be built into the housing in a different arrangement. Different combinations of these optical elements can also be employed to achieve directed guidance of the light.

Figure 6:
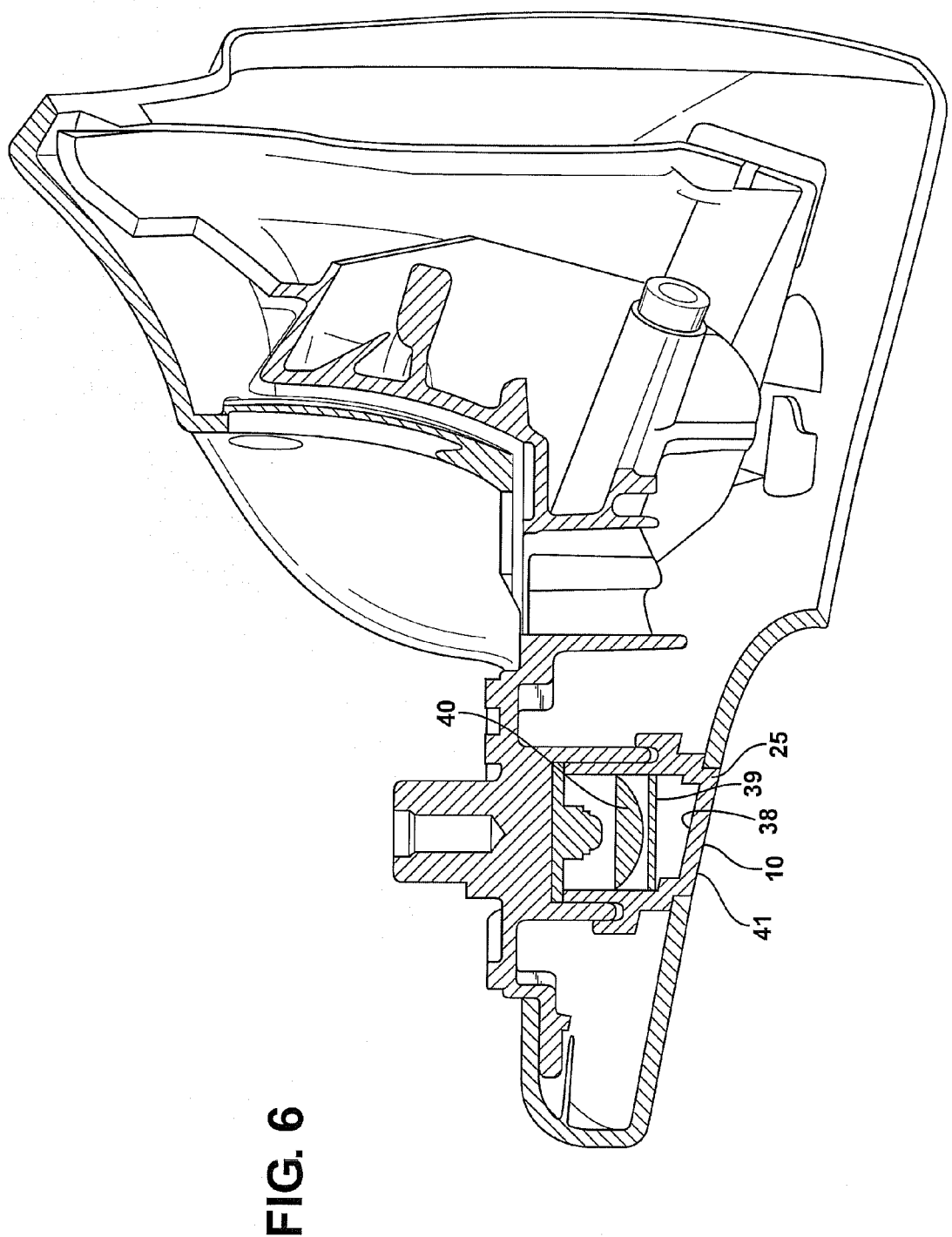

The optical elements 67, 39 and 4 are provided in the mirror mounting bracket 96 embodiment in FIG. 6 as in the previous example mirror mounting bracket 91 embodiment. In addition, a face 68 of the optical window 69 is provided with an optical structure 41.

In place of the light housings, described in the embodiments shown in FIGS. 1-6, an optical waveguide or a combination of an optical waveguide and light housing can also be used. The installation depth of the LEDs can likewise be varied with appropriate adjustment of the mirror mounting bracket in order to change the illuminated area.

Finally, the position of the perimeter light on the mirror mounting brackets described in FIGS. 1-6 on the mirror mounting bracket support 48 can also be changed as desired depending on which area next to the vehicle and on the ground is to be illuminated.

Of course, additional LEDs, for example arranged next to one another in rows, can also be used in place of the one LED 16 to increase the light intensity.

In all the embodiments described, there may be built into the exterior rearview mirror, in particular into the mirror head, lighting means as auxiliary turn signals, transmitters and/or receivers for garage door openers and/or for navigation systems, sensors as part of the control system for an EC or LCD glass, antennas for automotive radios, compasses and the like, loudspeakers and the like. Additional components, such as transmitters and/or receivers for garage door openers or for navigation systems, may also be built into the mirror mounting bracket.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. An external rearview mirror for a vehicle, said external rearview mirror comprising:

a mirror mounting bracket adapted to be fixedly secured to the vehicle, said mirror mounting bracket defining an interior and a receptacle extending through a portion of said interior;

a mirror head movably secured to said mirror mounting bracket, said mirror head including a reflective surface to view rearward of the vehicle; and a perimeter light fixedly secured to said receptacle within said mirror mounting bracket, said perimeter light including a light source and thermally conductive carrier extending radially out from said light source to optimize dissipation of thermal energy created by said light source throughout said mirror mounting bracket.

2. An external rearview mirror as set forth in claim 1 including a hole in the mirror mounting bracket above said thermally conductive carrier.

3. An external rearview mirror as set forth in claim 2 wherein said thermally conductive carrier engages said mirror mounting bracket at a periphery of said thermally conductive carrier to enhance thermal transfer away from said light source.

4. An external rearview mirror as set forth in claim 3 wherein said perimeter light defines an annular groove for receiving a portion of said receptacle therein to enclose said light source in said perimeter light.

5. An external rearview mirror as set forth in claim 3 wherein said light source is an LED.

6. An external rearview mirror as set forth in claim 5 wherein said perimeter light includes a printed circuit board.

7. An external rearview mirror as set forth in claim 6 wherein at least a portion of thermally conductive carrier is connected to said printed circuit board.

* * * * *